(12) United States Patent
Tanskanen (10) Patent No.: US 7,493,644 B1
(45) Date of Patent: Feb. 17, 2009

(54) METHOD, APPARATUS, AND SYSTEM FOR VIDEO FAST FORWARD FUNCTIONALITY IN A MOBILE PHONE

(75) Inventor: Erkki Tanskanen, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/473,356

(22) Filed: Dec. 28, 1999

(51) Int. Cl.
*H04N 7/16* (2006.01)
*H04N 7/163* (2006.01)

(52) U.S. Cl. .................. 725/62; 725/102; 725/105; 725/139; 725/143

(58) Field of Classification Search ............. 725/97, 725/105, 139, 143, 62
See application file for complete search history.

(56) References Cited

U.S. PATENT DOCUMENTS

| | | | | |
|---|---|---|---|---|
| 5,579,239 | A | * | 11/1996 | Freeman et al. ......... 348/14.01 |
| 5,617,502 | A | | 4/1997 | Ort et al. ................... 386/97 |
| 5,771,335 | A | | 6/1998 | Lee ........................... 386/111 |
| 5,784,572 | A | | 7/1998 | Rostoker et al. ............ 395/200 |
| 5,867,625 | A | | 2/1999 | McLaren |
| 5,923,755 | A | * | 7/1999 | Birch ........................ 380/212 |
| 6,049,551 | A | * | 4/2000 | Hinderks et al. ............ 370/468 |
| 6,128,653 | A | * | 10/2000 | del Val et al. ............... 709/219 |
| 6,434,748 | B1 | * | 8/2002 | Shen et al. ................. 725/89 |
| 6,445,738 | B1 | * | 9/2002 | Zdepski et al. ......... 375/240.01 |

(Continued)

FOREIGN PATENT DOCUMENTS

EP 0701376 A2 3/1996

(Continued)

OTHER PUBLICATIONS

Björklund, Dan; Int'l Application published under the PCT re: Method for the Transmission of Video Images, Int'l Pub. No. WO 98/26603, Int'l Pub. Date Jun. 18, 1998, U.S. Priority Date Dec. 9, 1996.

(Continued)

*Primary Examiner*—Hunter B. Lonsberry
(74) *Attorney, Agent, or Firm*—Banner & Witcoff, Ltd.

(57) ABSTRACT

This present invention includes a method and an apparatus for receiving motion video, a method and a system for transmitting motion video, and software to implement the methods and to program the system and the apparatus. The method for receiving motion video includes receiving motion video data at a wireless from a motion video server via a wireless interface, displaying the motion video on a video display on the wireless terminal, and transmitting to the motion video server via the wireless interface display control commands to alter the presentation characteristics of received motion video. If for instance the display control command instructs the motion video server to increase the speed of the motion depicted in the video presentation, the motion video server may filter out any audio data and reduce the number of video image frames transmitted to the wireless terminal. The method for transmitting motion video includes receiving motion video data from a motion video server, transmitting the motion video data to a wireless terminal via a wireless interface, receiving from the wireless terminal via the wireless interface display control commands to alter the presentation characteristics of motion video, and transmitting the display control commands to the motion video server. The invention may be implemented, for example, in an apparatus such as a wireless telephone and in a system such as a digital wireless telephony network.

21 Claims, 5 Drawing Sheets

Block diagram of a method to transmit via a wireless interface system a motion video having Fast Forward presentation characteristics.

U.S. PATENT DOCUMENTS

| | | | |
|---|---|---|---|
| 6,470,378 B1 * | 10/2002 | Tracton et al. | 709/203 |
| 6,487,642 B1 * | 11/2002 | Duruoz et al. | 711/145 |
| 6,526,100 B1 | 2/2003 | Kalliokulju et al. | |
| 6,621,979 B1 * | 9/2003 | Eerenberg et al. | 386/68 |
| 6,658,199 B1 * | 12/2003 | Hallberg | 386/68 |
| 6,965,724 B1 * | 11/2005 | Boccon-Gibod et al. | 386/68 |

FOREIGN PATENT DOCUMENTS

| | | |
|---|---|---|
| EP | 0713338 A2 | 5/1996 |
| WO | WO 99/57910 | 11/1999 |

OTHER PUBLICATIONS

D. Hoffman, et al. "RTP Payload Format for MPEG1/MPEG2 Video," AT&T Labs—Research, Jan. 1998.

* cited by examiner

FIG. 1 Block diagram of a wireless system for a variable playback of a motion video.

FIG. 2 Block diagram of a data stream during normal playback.

Motion Video image frames 240

Motion video data streams 210:

Initial data stream 211

FIG. 3 Block diagram of a data stream having very fast motion presentation characteristics.

Subsequent data stream 211

FIG. 4 Block diagram of a data stream having fast motion presentation characteristics.

Subsequent data stream 211

FIG. 5 Block diagram of a wireless terminal.

FIG. 6 Block diagram of a method to transmit via a wireless interface system a motion video having Fast Forward presentation characteristics.

FIG. 7 Block diagram of a method to display on a wireless terminal a motion video received having Fast Forward presentation characteristics.

METHOD, APPARATUS, AND SYSTEM FOR VIDEO FAST FORWARD FUNCTIONALITY IN A MOBILE PHONE

FIELD OF THE INVENTION

The present invention relates to the field of motion video playback systems. More specifically, the present invention relates to fast forward functionality of motion video playback in wireless phone systems.

BACKGROUND OF THE INVENTION

Digital motion video playback systems have undergone much improvement in recent years. As microchip processors have become faster and data storage mediums have increased data storage capacities, digital motion video playback has become an increasingly viable option for smaller devices operating with limited resources. For instance, handheld digital video disc (DVD) players permit the user to view a feature film on a small liquid crystal display (LCD) attached to the player. Inherent in efficient digital motion video storage and transmission are data compression and encoding techniques which permit preferred balancing of playback quality, data file size, and available bandwidth. Among the primary motion video compression standards are H.261, H.263, and those established by the Moving Pictures Experts Group (MPEG), including MPEG-1, MPEG-2, and MPEG-4, which provide for increasing playback quality in exchange for higher bit rates requiring larger bandwidths for transmission.

Issues regarding bandwidth requirements become magnified when data rich applications are implemented in a wireless transmission context. Wireless phone service providers are always mindful of the limited bandwidths available for their use while attempting to maximize capacity on their cellular networks. The progression of cellular network technology from analog signals to digital signals significantly increased the subscriber capacities as well as possible capabilities of wireless cellular networks, but improvements have been incremental since the advent of digital service. By varying the transmission format, e.g., time division multiple access (TDMA) versus code division multiple access (CDMA), and the wireless communication standard, e.g., GSM, TETRA, and UMTS, varying levels of network performance can be achieved. Though, the limited bandwidth of a wireless phone system still poses serious problems for the transmission of the huge volumes of data required to display high quality motion video. Sophisticated compression procedures present partial solutions. Formatting the video for smaller screens helps also. Efforts are underway to further fine-tune a feasible solution.

One aspect of motion video playback on a wireless phone that raises special difficulties is dealing with skipping back or ahead in the video during playback. For instance, if a user wishes to view a clip of a video halfway into the video, the user would prefer to skip ahead to the desired clip than to view the entire length of the video preceding the clip. When the video display device has the data storage capacity to store the entire motion video, such as with the handheld DVD player, skipping between clips spread out across the duration of the motion video can be done readily by accessing the associated data directly. However, in the context of a wireless phone, little more than a short duration of the motion video will likely be buffered in the phone memory, so skipping between clips must be done remotely from the source of the motion video.

SUMMARY OF THE INVENTION

This present invention includes a method and an apparatus for receiving motion video as well as the software necessary to implement the method and to program the apparatus. The method includes receiving motion video data at a wireless terminal from a motion video server via a wireless interface, displaying the motion video on a video display on the wireless terminal, and transmitting to the motion video server via the wireless interface display control commands to alter the presentation characteristics of received motion video. The motion video is received having fixed presentation characteristics, according to which the motion video images are presented on the display. By transmitting the display control commands to the motion video server via the wireless interface, the wireless terminal may remotely alter the presentation characteristics of the received motion video, and hence may alter the way in which the motion video is presented on the display. The invention may be embodied in an apparatus such as a wireless telephone.

The user of the wireless terminal may alter the presentation characteristics so as, among other options, to increase or decrease the speed of the motion depicted in the video presentation, reverse the direction of the depicted motion, or both. In particular, if the display control command instructs the motion video server to increase the speed of the motion depicted in the video presentation, the motion video server may filter out any audio data and sample the video data comprising the motion video to reduce the number of video image frames transmitted to the wireless terminal. The user may repeatedly input a new display control command to alter the presentation characteristics of the motion video, such as to reset them to the standard playback presentation characteristics of the motion video which would re-synchronize the audio data with the video data.

The present invention also includes a method and a system for transmitting motion video, as well as the software necessary to implement the method and program the system. The method includes receiving motion video data from a motion video server, transmitting the motion video data to a wireless terminal via a wireless interface, receiving from the wireless terminal via the wireless interface display control commands to alter the presentation characteristics of motion video, and transmitting the display control commands to the motion video server. The invention may be implemented, for example, using a digital wireless telephony network which may include multiple cellular base stations.

The details of one or more embodiments of the inventions are set forth in the accompanying drawings and the description below. Other features, objects, and advantages of the invention will be apparent from the description and drawings, and the claims.

DETAILED DESCRIPTION

Figure 1:
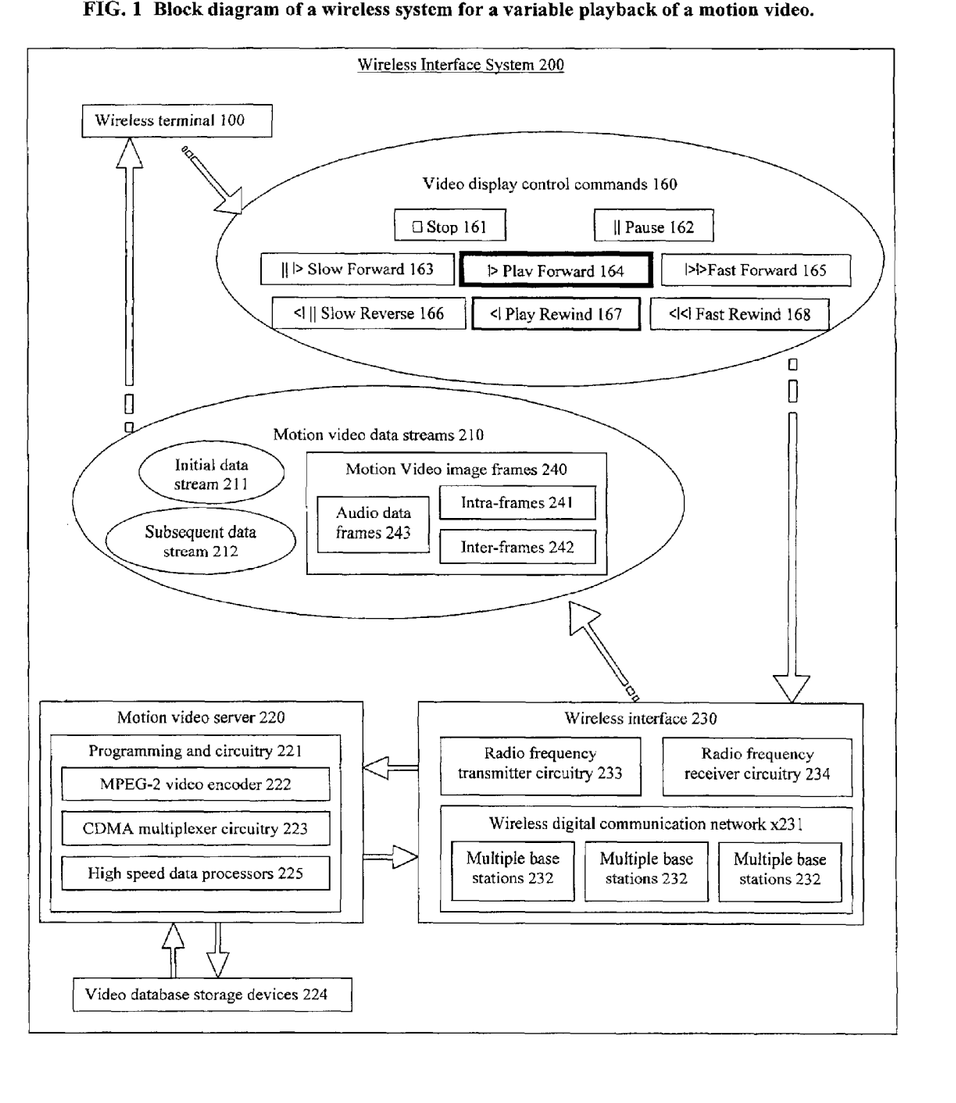
FIG. 1 is a block diagram of a wireless system for a variable playback of a motion video.

FIG. 1 shows a system 200 for receiving motion video data streams 210 transmitted from a motion video server 220 to a wireless terminal 100 over a wireless interface 230 and displaying the motion video to a terminal user. Implementations of the system 200 may include a display control command input device 130 allowing the user to send video display control commands 160 from the terminal 100 to the video server 220. The video display control commands 160 can be used to alter the presentation characteristics of the motion video, e.g. to change the speed of the motion video, to reverse the video, to stop and/or pause the video, and to make other changes to the presentation characteristics of the video.

Motion video can be transmitted from the video server 220 to the terminal 100 in a digitally compressed and encoded form, such as MPEG-2. Digitally compressed and encoded motion video is typically composed of a series of video image frames 240 which are presented in rapid succession to the user to give the appearance of motion. For example, a television set may present thirty video frames per second to form a motion picture. Digitally compressed and encoded motion video frames 240 may include Intra-frames 241 and Inter-frames 242. In general, an Intra-frame 241 includes full picture information needed to render the frame to a display 120, while an Inter-frame 242 includes picture information that depends on one or more Intra-frames 241. For example, an Inter-frame 242 may form am image using received data that identifies incremental changes to a previous frame. Using Inter-frames 240 and Intra-frames 241 may help reduce the bit rate of a transmitted full motion video image.

After the user activates video receiving functions on the terminal 100, the terminal 100 establishes a connection with a motion video server 220 over a wireless interface 230. The terminal 100 may receive information over the wireless interface 230 from the motion video server 220 identifying motion videos available for viewing. The user of the terminal 100 may then select a motion video to display. The user may also select presentation characteristics of the video. For example, the user may select a fast-forward presentation. The user inputs the selection on a display control command input device 130 on the terminal 100. The terminal 100 transmits this selection information to the motion video server 220 over the wireless interface 230. The motion video server 220 may package the selected motion video as a data stream 210 of compressed, encoded video images. The wireless interface 230 transmits the data stream 210 to the wireless terminal 100, which receives and processes the data stream 210. The terminal 100 may decompress and decode the video images to display the motion video on a video display 120 on the terminal 100. The video display 120 will display the video images according to presentation characteristics inherent in the motion video. For instance, when the video server 220 transmits a motion video in fast forward, the video display 120 will present the video in fast forward.

The user may select different presentation characteristics of the received motion video by inputting a new display control command 160 on the display control command input device 130. The terminal 100 transmits the display control command 160 to alter the presentation characteristics of the motion video over the wireless interface 230. The motion video server 220 receives and responds to the display control command 160 by adjusting the way in which the motion video server 220 packages the compressed, encoded video images within the data stream 210. The motion video server 220 transmits the motion video with the altered presentation characteristics as a subsequent data stream 212. The terminal 100 receives and processes the subsequent data stream 212. The video display 120 decompresses, decodes and displays the sequence of video images contained in the subsequent data stream 212. The motion video displayed using the subsequent data stream 212 has the altered presentation characteristics specified by the display control command 160 selected by the user.

Multiple implementations are possible given the variety of ways in which the elements may be combined. For instance, the wireless interface 230 may be wireless digital communication network 231 having multiple base stations 232 spread out in a honeycomb fashion designed to accommodate a number of wireless telephone subscribers 101. The base stations 232 may have radio frequency transmitter circuitry 233 capable of transmitting the motion video data streams 210 to the wireless terminal 100 and radio frequency receiver circuitry 234 capable of receiving the display control commands 160 from the wireless terminal 100. The motion video server 220 may be present at a base station 232 or it may be connected to the wireless interface 230 via the Internet or via another off-site, network connection. The server 220 includes programming and circuitry 221 capable of processing the display control commands 160 and configuring the data streams 210 accordingly. For example, the server 220 may include an MPEG-2 video encoder 222 and a CDMA multiplexer circuitry 223. The motion video server 220 may be connected either internally or via a network connection to one or more video database storage devices 224 storing the available motion videos. The server 220 may also have one or more high speed data processors 225 to configure multiple data streams 210, each destined for a different wireless terminal 100.

The wireless terminal 100 could be a modified cell phone 101, a modified personal data assistant (PDA) 102, or a laptop computer with a wireless modem 103. The display control command input device 130 may be a keypad 131, a pointing device 132, a set of buttons 133, an on-screen cursor-based menu 134, or voice-activated circuitry 135. The input device 130 may further be a display control command-specific dedicated device 136 (as appears on a typical CD player remote control), or a multiple-function device 137 (such as a computer mouse or a dial pad on a phone). The video display 120 may display either color images or monochromatic images.

The motion video comprises a sequence of video images encoded as video dqata. The sequence of video images is characterized by standard presentation characteristics. One presentation characteristic corresponds to the apparent speed of the relative motion depicted by the motion video. The standard apparent speed of the relative motion depicted by the motion video is referred to as real-time. A motion video is displayed at a substantially real-time if the apparent speed of the relative motion approximates the standard presentation characteristics. Another presentation characteristic corresponds to the apparent time order of the motion depicted by the motion video. Displaying the motion video images in their standard time order characterizes a forward presentation, whereas displaying the motion video images in reverse time order characterizes a reverse presentation.

The presentation characteristics of a motion video correspond inversely with the time-delay between the display of the video images at the start and finish of the sequence. A sequence of encoded video images typically includes time-stamp data indicating the standard display time of each image relative to the beginning of the motion video. The standard display time of each image relative to the other images within the sequence is referred to as the standard time-delay between video images. Presentation characteristics corresponding to real-time occur when the motion video is displayed using the standard time-delay between video images.

When a sequence of video images is displayed in less time than the time characteristic of the standard presentation, the relative motion video appears faster. When the relative motion of a motion video appears faster than the standard apparent speed of the relative motion, the presentation of the motion video is characterized by relative motion which is faster than real-time. Conversely, when a sequence of video images is displayed in more time than the time characteristics of the standard presentation, the relative motion of the motion video appears slower. When the relative motion of the motion video appears slower than the standard apparent speed of the relative motion, the presentation of the motion video is characterized by relative motion which is slower than real-time.

In order to alter the presentation characteristics of the motion video, the motion video server 220 may adjust the sequence of the compressed, encoded video images within the data stream 210. Changes in the presentation characteristics of the motion video may or may not be accompanied by a change in the bit rate of digitized video information transmitted from the base station to the wireless terminal 100. For example, displaying a fast forwarded video for 15 seconds may require the same data rate as displaying a normal video for 15 seconds; the rates may be equalized by eliminating extraneous frames from the fast forwarded video. To accelerate the presentation and relative motion of the motion video, the sequence of video images may be filtered. By filtering the sequence of video images, fewer images are displayed to represent the motion video. Because fewer images are displayed, they may be displayed in less time, giving the appearance that the relative motion is occurring more quickly. Hence the motion video is presented faster than real-time.

Figure 2:
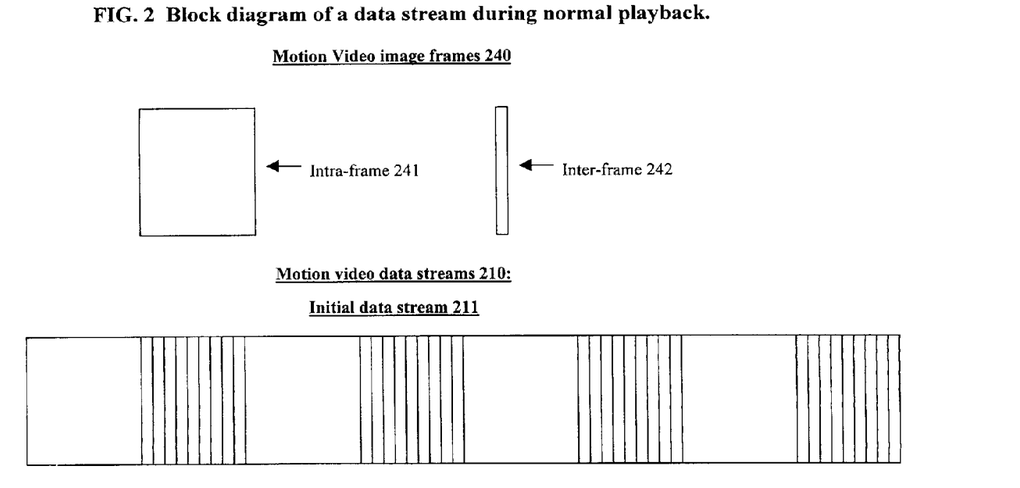
FIG. 2 is a block diagram of a data stream during normal playback.

FIG. 2 shows a representation of the initial data stream 211. Typical data compression methods used to compress motion video data separate the data into frames 240 known as Intra-frames 241 and Inter-frames 242. An Intra-frame 241 is an independent representation of a video image, whereas an Inter-frame 242 is a video image representation dependent on one or more Intra-frames 241. Inter-frames 242 generally are displayed in time between Intra-frames 241, and Inter-frames 242 frequently outnumber Intra-frames 241 to achieve higher data compression rates. Each frame is encoded with a data packet header describing the contents, such as whether the frame is an Intra-frame 241 or Inter-frame 242, or contains audio or video data.

One technique to alter the presentation characteristics to achieve a fast forward motion video presentation is to filter sequence is to select a representative sampling of the sequence. A representative sampling of the sequence may be displayed in less time than the time necessary to display the entire sequence. By displaying a representative sampling of a sequence of video images instead of the entire sequence, a presentation is achieved that characterized as faster than real-time. A representative sampling of a sequence of video images encoded as Intra-frames 241 and Inter-frames 242 may be selected by reducing the number of Inter-frames 242 within the sequence.

Figure 3:
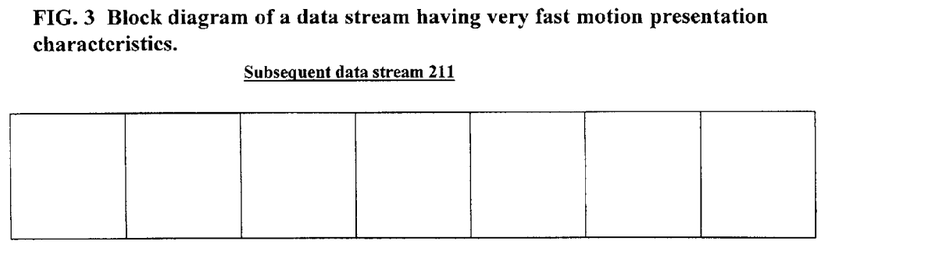
FIG. 3 is a block diagram of a data stream having very fast motion presentation characteristics.
Figure 4:
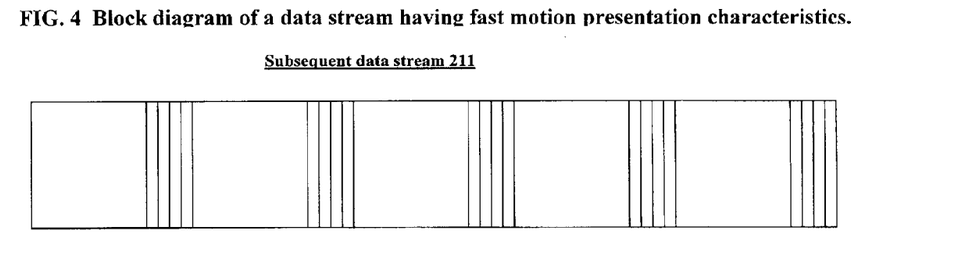
FIG. 4 is a block diagram of a data stream having fast motion presentation characteristics; and, FIG. 5 is a block diagram of a wireless terminal.

FIG. 3 shows a representation of a subsequent data stream 212 having altered presentation characteristics that correspond to faster than real-time relative motion. The sequence of video images has been filtered to reduce the number of Inter-frames 242 separating the Intra-frames 241. In FIG. 3, the number of Inter-frames 242 has been reduced to zero, however, it is not necessary to eliminate all Inter-frames 242 to achieve a presentation characterized by relative motion that is faster than real-time. The greater the reduction in the number of frames 240 received and displayed per sequence of video images (i.e. the more frames 242 that are filtered out), the more rapidly the sequence is displayed, and thus the faster the relative motion of the motion video. In FIG. 4, the number of Inter-frames 242 has been reduced by over half. For a given sequence of video images, FIG. 4 represents a motion video presentation characterized by relative motion faster than relative motion of the motion video presentation represented by FIG. 2. In contrast, the relative motion of FIG. 4 is slower that the relative motion of FIG. 3.

At any point during the display of the motion video having the altered presentation characteristics, the user again may select to alter the presentation characteristics of the motion video. The user inputs the display control command 160 corresponding to the intended presentation characteristics, and the display control command 160 is transmitted to the motion video server 220 over the wireless interface 230. As before, the motion video server 220 adjusts the sequence of the video image frames 240 that appears in the data stream 210 to reflect the intended presentation characteristics of the motion video to be transmitted to the wireless terminal 100.

The motion video may also include a soundtrack, compressed and encoded in audio data. The soundtrack may be synchronized with the video images. During the display of a motion video characterized by a presentation that is faster than real-time, the motion video server 220 may also filter the data frames 240 to remove the frames 243 that correspond to audio data. This also accelerates the presentation of motion video in so far as fewer frames 240 are transmitted to the wireless terminal 100. The audio frames 243 are identified as such by a stream-identification within the packet header. While the audio data frames 243 are being filtered out, the motion video server 220 maintains synchronization of the audio data with the corresponding video data to permit full audiovisual performance of the motion video once the presentation characteristics are reset to standard real-time.

Synchronization of the audio and video is achieved by tracking the time-stamp data of the video images transmitted to the terminal 100. For each motion video available on the motion video server 220, the server 220 has a database of time-stamp information detailing the standard presentation characteristics of location and timing of each audio or video frame relative to the beginning of the given motion video. By comparing the time-stamp data of the most recently transmitted video image with the standard presentation location and timing information for that video image, the motion video server 220 determines what audio and video frames 240 are in synchronization when the presentation characteristics are reset to standard real-time. Once the user selects to display the motion video at real-time, the motion video server 220 ceases to filter the data frames 242 and 243 and sequences the frames 240 so that they are audiovisual synchronization with one another.

Figure 5:
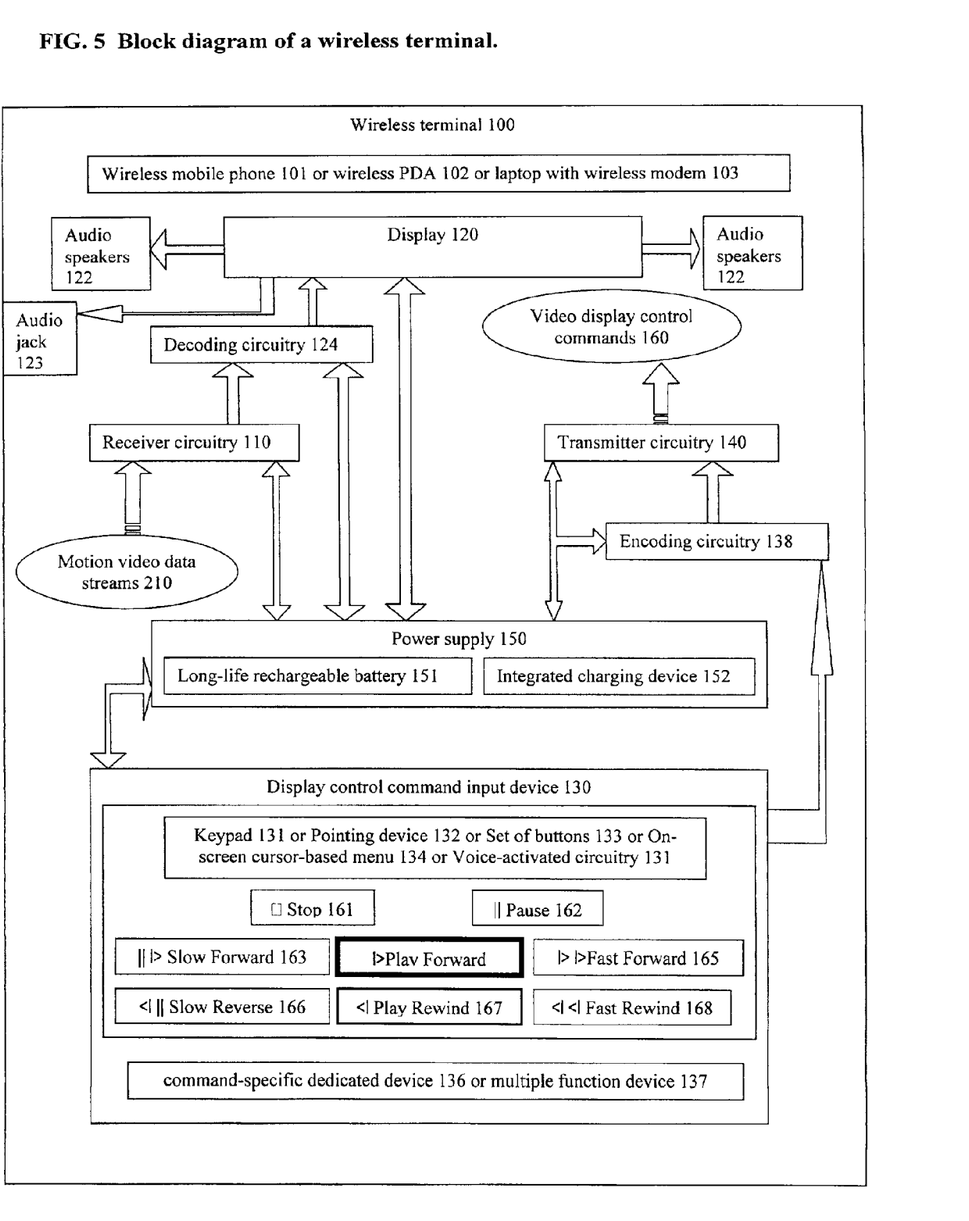

FIG. 5 shows a wireless terminal 100 for receiving and displaying motion video data. The wireless terminal 100 has radio frequency receiver circuitry 100; a video display 120; a display control command input device 130; radio frequency transmitter circuitry 140; and a power supply 150, all electronically coupled. In one implementation, the wireless terminal 100 may be a digital wireless telephone 101.

The radio frequency receiver circuitry 110 receives radio signals encoding data streams 210 comprising motion video images. The receiver circuitry 110 relays the motion video data to the video display 120 to be displayed.

The video display 120 displays the received motion video. The video display 120 has display circuitry 121 to rasterize the motion video on a screen. The video display 120 may be a liquid crystal display (LCD) or other commonly known display, which may display images in monochrome or color. The video display 120 may also have audio speakers 122, coupled either internally or externally via an audio jack 123. The video display 120 may also have decompression and decoding circuitry 124 to process the data streams 210 relayed by the receiver circuitry 110. The audio speakers 122 may receive audio signals from the decompression and decoding circuitry 124 and replicate the received soundtrack in synchronization with the video images during the playback of the received motion video.

The display control command input device 130 generates the display control command 160, which alters the presentation characteristics of received motion video. The display control command input device 130 may be a keypad 131, a pointing device 132, a set of buttons 133, an on-screen cursor-based menu 134, or voice-activated circuitry 135. The input device 130 may further be a display control command-specific dedicated device 136 (as appears on a typical CD player remote control), or a multiple-function device 137 (such as computer mouse of a dial pad on a phone). The display control commands 160 available on the input device 130 may include Stop 161, Pause 162, Slow Forward 163, Play Forward 164, Fast Forward 165, Slow Reverse 166, Play Rewind 167, and Fast Rewind 168. The display control command input device 130 may also have compression and encoding circuitry 138 to process the display control command 160 prior to relaying the display control command 160 to the transmitter circuitry 140 to be transmitted.

Display control command Stop 161 stops the display of the motion video, while Pause 162 causes the instant video image to remain displayed as a still image. Slow Forward 163 displays the motion video at a forward presentation characterized as slower than real-time; Play Forward 164 displays the motion video at a forward presentation characterized as real-time; and Fast Forward 165 displays the motion video at a forward presentation characterized as faster than real-time. Slow Reverse 166 displays the motion video at a reverse presentation characterized as slower than real-time; Play Rewind 167 displays the motion video at a reverse presentation characterized as real-time; and Fast Rewind 168 displays the motion video at a reverse presentation characterized as faster than real-time.

The radio frequency transmitter circuitry 140 transmits over a wireless interface 230 to a motion video server 220 radio signals encoding the display control command 160 relayed from the display control command input device 130.

The power supply 150 supplies electrical power to the wireless terminal 100. Any appropriate power supply may be chosen. The power supply 150 may include a long-life, rechargeable battery 151 and possibly an integrated recharging device 152.

Figure 6:
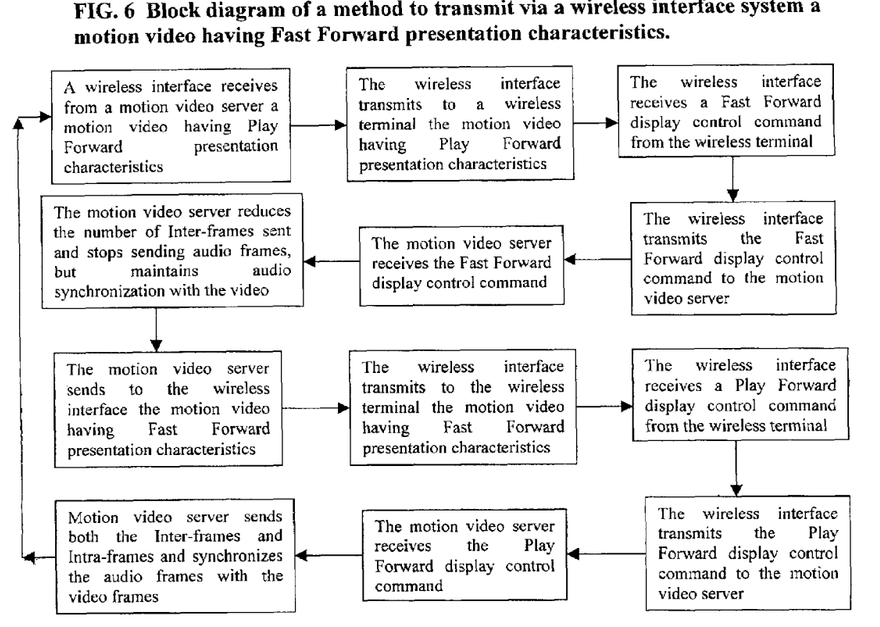
FIG. 6 is a block diagram of a method to transmit via a wireless interface system a motion video having Fast Forward presentation characteristics.
Figure 7:
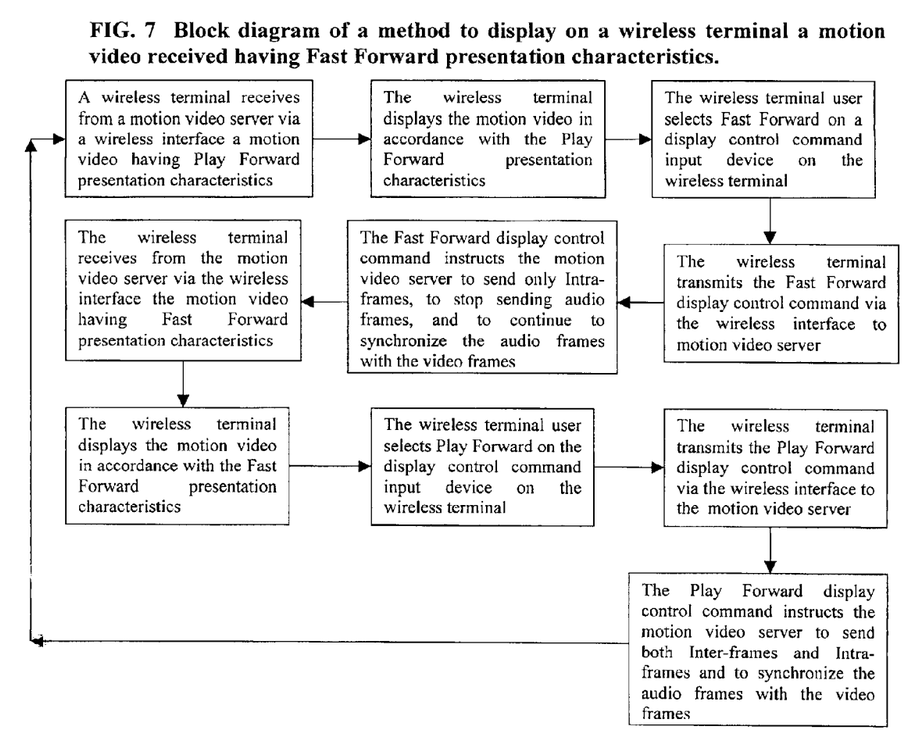
FIG. 7 is a block diagram of a method to display on a wireless terminal a motion video received having Fast Forward presentation characteristics.

FIG. 6 is a block diagram of a method to transmit via a wireless interface system 200 a motion video having Fast Forward 165 presentation characteristics. FIG. 7 is a block diagram of a method to display on a wireless terminal 100 a motion video received having Fast Forward 165 presentation characteristics. In both FIG. 6 and FIG. 7, the Fast Forward display control command 165 may be substituted with a Fast Rewind display control command 168 without changing the steps of the method.

The invention may be implemented using either a stationary or mobile wireless terminal 100. An example of a mobile wireless terminal may be a mobile wireless telephone 101, as discussed above, whereas an example of a stationary wireless terminal may be a wireless terminal affixed to a residence as a alternative to a landline communication connection. It is understood that any connection within the system may be wired or wireless. Moreover, the invention may be implemented in entirely wired systems in addition to wireless systems. In an entirely wired system, the wired interface between the motion video server 220 and the wired terminal may be any data network connection, such as an internet, an intranet, or an ethernet, using any connection means, such as coaxial cables, telephone landlines, fiber optic cables, or power lines.

A number of embodiments of the present invention have been described. Nevertheless, it will be understood that various modifications may be made without departing from the spirit and scope of the invention. For example, changes in the presentation characteristics of the motion video may or may not be accompanied by a change in the bit rate of digitized video information transmitted from the base station 232 to the wireless phone 101. Accordingly, other embodiments are within the scope of the following claims.

It is also understood that receiving, displaying and transmitting digital data requires appropriate digital processors and memory storage devices to store, buffer and process the data. Appropriate software is also necessary to program the electronic devices to function as intended. Moreover, operation on a cellular telephony network requires wireless phone validation, synchronization, and power control methods and devices, among other commonly known aspects of cellular telephony art. Implementations may use any wireless interface format capable of supporting the data transmissions. For instance, a wireless interface format may be a standard such as CDMA, TDMA, GSM, GSM++, HSCSD, GPRS, UMTS, xDSL, or POTS. Implementations may also use any motion video compression format, including H.261, H.263, MPEG-1, MPEG-2, and MPEG-4.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designated ASICs (application-specific integrated circuits).

What is claimed is:

1. A method comprising:
transmitting via a wireless interface from a motion video server to a wireless apparatus, a first data stream comprising a motion video having a plurality of intra-frames, each intra-frame being distant from another intra-frame by at least one inter-frame, the motion video having initial presentation characteristics, wherein the motion video is synchronized to audio data;
receiving at the motion video server via the wireless interface a first display control command at the wireless apparatus comprising an indication of intended presentation characteristics of the motion video;
creating at the motion video server, based upon reception of the first control command, a second data stream comprising motion video having the intended presentation characteristics, wherein the second data stream is created by filtering inter-frames between each intra-frame of the first data stream, causing the number of inter-frames between each intra-frame to be an altered value from a group of available values, according to a presentation speed selected from a plurality of presentation speeds specified within the first control command; and
storing time stamp information for maintaining synchronization of the motion video and audio data comprising the location and timing of each audio and video frame relative to the beginning of the motion video.

2. The method of claim 1, further comprising:
transmitting the second data stream from the motion video server via the wireless interface to the wireless apparatus.

3. The method of claim 1, wherein the initial presentation characteristics comprise a presentation direction selected from the group consisting of forward and reverse, and further comprise a presentation speed selected from the group consisting of slower than real-time, substantially real-time, and faster than real-time, and wherein
the first display control command comprises a display control command altering the initial presentation characteristics and is selected accordingly from the group consisting of Stop, Pause, Slow Forward, Play Forward, Fast Forward, Slow Reverse, Play Rewind, and Fast Rewind.

4. The method of claim 3, further comprising:
receiving the motion video server via the wireless interface a second display control command to alter presentation characteristics of the second data stream, the second display control command comprising a synchronization command to maintain synchronization between the audio data and the video data.

5. The method of claim 4, wherein:
the second data stream further comprises a plurality of Intra-frames, each Intra-frame of the second data stream being separate from other Intra-frames in the plurality of Intra-frames by fewer Intra-frames than separate the Intra-frames in the first data stream,
the altered presentation characteristics differ from the initial presentation characteristics; and
the altered presentation characteristics further comprise a faster than real-time presentation selected from the group consisting of the presentations associated with display control commands Fast Forward and Fast Rewind.

6. The method of claim 4, wherein:
the wireless interface further comprises a digital cellular telephony network comprising a plurality of cellular base stations;
the wireless interface is connected to the motion video server via a network connection; and
the wireless apparatus further comprises a cellular telephone.

7. A computer readable medium comprising computer-executable instructions that when executed perform a method comprising:
receiving by radio frequency receiver circuitry at a wireless apparatus a first data stream from a motion video server via a wireless interface, wherein the—first data stream comprises a motion video having a plurality of intra-frames, each intra-frame being distant from another intra-frame by at least one inter-frame, the motion video having initial presentation characteristics, wherein the motion video is synchronized to audio data;
displaying the motion video having initial presentation characteristics on a video display of the apparatus; and
transmitting by radio frequency transmitter circuitry to the motion video server via the wireless interface a—first display control command at the apparatus comprising an indication of intended presentation characteristics of the motion video, wherein the first control command is configured to request a second data stream comprising motion video having the intended presentation characteristics, wherein the second data stream is created by filtering inter-frames between each intra-frame of the first data stream, causing the number of inter-frames between each intra-frame to be an altered value from a group of available values, according to a presentation speed selected from a plurality of presentation speeds specified within the first control command wherein time stamp information is created for maintaining synchronization of the motion video and audio data comprising the location and timing of each audio and video frame relative to the beginning of the motion video.

8. The computer-readable medium of claim 7, further comprising instructions, that when executed, further comprise:
receiving the second data stream from the motion video server via the wireless interface at the apparatus.

9. The computer-readable of claim 8, wherein:
the initial presentation characteristics comprise a presentation direction selected from the group consisting of forward and reverse, and, a presentation speed selected from the group consisting of slower than real-time, substantially real-time, and faster than real-time; and
the first display control command comprises a display control command altering the initial presentation characteristics and is selected accordingly from the group consisting of Stop, Pause, Slow Forward, Play Forward, Fast Forward, Slow Reverse, Play Rewind, and Fast Rewind.

10. The computer-readable medium of claim 9 further comprising instructions, that when executed, further comprise:
receiving at the wireless apparatus a second data stream from the motion video server via the wireless interface having altered presentation characteristics;
displaying the motion video having altered presentation characteristics on the video display; and
transmitting to the motion video server via the wireless interface a second display control command to alter presentation characteristics of received motion video, the second display control command comprising a second synchronization command to maintain synchronization between the audio data and the video data.

11. The computer-readable medium of claim 10 wherein:
the altered presentation characteristics reflect the selection of the first display control command;
the altered presentation characteristics comprise a presentation direction selected from the group consisting of forward and reverse, and, a presentation speed selected from the group consisting of slower than real-time, substantially real-time, and faster than real-time;
the second display control command differs from the first display control command; and
the second display control command comprises a display control command altering the altered presentation characteristics and is selected accordingly from the group consisting of Stop, Pause, Slow Forward, Play Forward, Fast Forward, Slow Reverse, Play Rewind, and Fast Rewind.

12. The computer-readable medium of claim 10 wherein:
the second data stream further comprises a plurality of Intra-frames, each Intra-frame of the second data stream being separated from other Intra-frames in the plurality of Intra-frames by fewer Inter-frames than separate the Intra-frames in the first data stream,
the altered presentation characteristics differ from the initial presentation characteristics, and
the altered presentation characteristics further comprise a faster than real-time presentation selected from the group consisting of the presentations associated with display control commands Fast Forward and Fast Rewind.

13. The computer-readable medium of claim 10 wherein:
the wireless interface further comprises a digital cellular telephony network comprising a plurality of cellular base stations;
the wireless interface is connected to the motion video server via a network connection; and
the wireless apparatus further comprises a cellular telephone.

14. An apparatus, comprising:
a receiver configured to receive from a motion video server via a wireless interface a motion video having a plurality of intra-frames, each intra-frame being distant from another intra-frame by at least one inter-frame, the motion video having initial presentation characteristics, wherein the motion video is synchronized to audio data;
a video display configured to receive the first data stream and further configured to display the motion video having the initial presentation characteristics;
a user-activated display control command input device configured to generate a first display control command subsequent to commencing display of at least a portion of the motion video, wherein the first display control command comprises a request for motion video having intended presentation characteristics created by filtering inter-frames between each intra-frame of the first data stream, causing the number of inter-frames between each intra-frame to be an altered value from a group of available values, according to a presentation speed selected from a plurality of presentation speeds specified within the first control command;
a transmitter configured to transmit to the motion video server via the wireless interface the first display control command, wherein the receiver is further configured to receive a second data stream
comprising motion video having the intended presentation characteristics; and
a computer readable medium for storing time stamp information for maintaining synchronization of the motion video and audio data comprising the location and timing of each audio and video frame relative to the beginning of the motion video.

15. The apparatus of claim 14, wherein:
the initial presentation characteristics comprise a presentation direction selected from the group consisting of forward and reverse, and, a presentation speed selected from the group consisting of slower than real-time, substantially real-time, and faster than real-time; and
the first display control command comprises a display control command altering the initial presentation characteristics and is selected accordingly from the group consisting of Stop, Pause, Slow Forward, Play Forward, Fast Forward, Slow Reverse, Play Rewind, and Fast Rewind.

16. The apparatus of claim 15 wherein:
the display control command input device is further configured to generate the second display control command and to transmit a second display control command to the transmitter circuitry.

17. The apparatus of claim 16, wherein:
the altered presentation characteristics reflect the selection of the first display control command;
the altered presentation characteristics comprise a presentation direction selected from the group consisting of forward and reverse, and, a presentation speed selected from the group consisting of slower than real-time, substantially real-time, and faster than real-time;
the second display control command differs from the first display control command; and
the second display control command comprises a display control command altering the altered presentation characteristics and is selected accordingly from the group consisting of Stop, Pause, Slow Forward, Play Forward, Fast Forward, Slow Reverse, Play Rewind, and Fast Rewind.

18. The apparatus of claim 16 wherein:
the wireless interface further comprises a digital cellular telephony network comprising a plurality of cellular base stations;
the wireless interface is connected to the motion video server via a network connection; and
the wireless apparatus further comprises a cellular telephone.

19. An apparatus comprising:
processor—configured to render video data into a first data stream, wherein the first data stream comprises a motion video having a plurality of intra-frames, each intra-frame being distant from another intra-frame by at least one inter-frame, the motion video having initial presentation characteristics, wherein the motion video is synchronized to audio data;
a transmitter for transmitting the first data stream to at least one wireless apparatus via a wireless communication network; and
a receiver for receiving display control commands that have been generated and transmitted by the at least one wireless apparatus, requesting alteration of the presentation characteristics of the motion video;
wherein upon receipt of a display control command the processor is configured to convert the video data into a second data stream comprising motion video having the intended presentation characteristics, wherein the second data stream is created by filtering inter-frames between each intra-frame of the first data stream, causing the number of inter-frames between each intra-frame to be an altered value from a group of available values, according to a presentation speed selected from a plurality of presentation speeds specified within the first control command; and a computer-readable medium configured to determine time stamp information for maintaining synchronization of the motion video and audio data comprising the location and timing of each audio and video frame relative to the beginning of the motion video.

20. The apparatus of claim 19, further comprising a multiplexer so that different data streams may be multiplexed for sending to different wireless apparatuses.

21. The apparatus of claim 19, wherein the display control commands further request an alteration in the bit rate of the first data stream.

\* \* \* \* \*

UNITED STATES PATENT AND TRADEMARK OFFICE
CERTIFICATE OF CORRECTION

PATENT NO. : 7,493,644 B1 Page 1 of 1
APPLICATION NO. : 09/473356
DATED : February 17, 2009
INVENTOR(S) : Erkki Tanskanen

It is certified that error appears in the above-identified patent and that said Letters Patent is hereby corrected as shown below:

In Column 9, Claim 5, Line 59:
Please replace "fewer Intra-frames" with --fewer Inter-frames--

In Column 12, Claim 19, Line 47:
Please replace "processor—configured" with --a processor—configured--

Signed and Sealed this

Twenty-fifth Day of August, 2009

David J. Kappos
*Director of the United States Patent and Trademark Office*